United States Patent
Ohno et al.

(10) Patent No.: US 7,769,808 B2
(45) Date of Patent: Aug. 3, 2010

(54) DATA INPUT TERMINAL, METHOD, AND COMPUTER READABLE STORAGE MEDIUM STORING PROGRAM THEREOF

(75) Inventors: Takashi Ohno, Kawasaki (JP); Satoshi Okuyama, Kawasaki (JP); Kenichi Horio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 137 days.

(21) Appl. No.: 12/232,388

(22) Filed: Sep. 16, 2008

(65) Prior Publication Data

US 2009/0077194 A1 Mar. 19, 2009

(30) Foreign Application Priority Data

Sep. 18, 2007 (JP) ............................. 2007-240511

(51) Int. Cl.
*G06F 15/16* (2006.01)
(52) U.S. Cl. .................. 709/203; 709/224; 709/238
(58) Field of Classification Search ......... 709/200–203, 709/217–238
See application file for complete search history.

(56) References Cited

U.S. PATENT DOCUMENTS

| | | | | |
|---|---|---|---|---|
| 5,905,711 A | * | 5/1999 | Chiussi et al. | 370/232 |
| 6,430,620 B1 | * | 8/2002 | Omura et al. | 709/231 |
| 6,600,737 B1 | * | 7/2003 | Lai et al. | 370/352 |
| 7,295,520 B2 | * | 11/2007 | Lee et al. | 370/236 |

FOREIGN PATENT DOCUMENTS

| | | |
|---|---|---|
| JP | 7-44495 | 2/1995 |
| JP | 63-268018 | 11/1998 |
| JP | 2002-026747 | 1/2002 |
| JP | 2003-188816 | 7/2003 |
| JP | 2007-34686 | 2/2007 |
| JP | 2007-34687 | 2/2007 |

OTHER PUBLICATIONS

United Kingdom Search Report issued on Dec. 4, 2008 in corresponding United Kingdom Patent Application No. GB0817064.9.

* cited by examiner

*Primary Examiner*—Moustafa M Meky
(74) *Attorney, Agent, or Firm*—Staas & Halsey LLP (57) ABSTRACT

The input unit stores data input by the user in the data storage. The status determiner determines reception status of the screen data to be one of three statuses of "abnormal", "normal", and "recovery" from "abnormal" to "normal" on the basis of frame losses. In a case of the "abnormal" status, a transmission controller does not read the input data stored in the data storage. In a case of the "normal" status, the transmission controller reads the input data stored in the data storage, transmits the input data via the transmitter, and deletes the input data stored in the data storage. In a case of the "recovery" status, the transmission confirmer instructs the output unit to output the input data stored in the data storage to ask the user whether to transmit the input data to the server.

13 Claims, 9 Drawing Sheets

DATA INPUT TERMINAL, METHOD, AND COMPUTER READABLE STORAGE MEDIUM STORING PROGRAM THEREOF

BACKGROUND OF THE INVENTION

1. Field of the Invention

The present invention relates to a terminal for inputting data to be transmitted to a server. More particularly, the present invention relates to a method that can control transmission of input data.

2. Description of the Related Art

The data input terminal has attracted attention as a thin client to solve problems that companies have faced with widespread use of personal computers (PCs), such as protection of important data stored in PCs used by individual employees and maintenance costs for a lot of PCs. The thin client system is a computer system with that business is conducted, instead of using PCs, by accessing a server or a PC (hereinafter, collectively referred to as server) managed in a center from a remote terminal through a communication network. The terminal displays a screen image on the basis of data received from the server, and transmits data input by a user to the server. Because the terminal stores little or no data, data protection of the terminal is easy. Moreover, the terminal performs limited functions. Accordingly, a maintenance cost of the terminal is much lower than that of PC. Generally, the data input by the user is immediately transmitted to the server. Accordingly, the communication network in a bad condition makes the synchronization of the displayed screen image with the input operations difficult, and causes inconvenience. To solve the problem, some techniques have been proposed (for example, see Japanese Laid-open Patent Publication No. 2007-34687). According to the technique discussed in Japanese Laid-open Patent Publication No. 2007-34687, when a terminal detects a disconnection of a communication, subsequent data of user input is stored in the terminal. After the connection is resumed, the stored data of user input is transmitted from the terminal to the server. However, the technique discussed in Japanese Laid-open Patent Publication No. 2007-34687 cannot deal with a case that the communication network is in a bad condition and the communication is delayed.

SUMMARY

Moreover, in a case of a communication complying with a session-less protocol such as User Datagram Protocol (UDP), because the protocol is not configured to have an idea of disconnection, it is not possible to apply the technique to the case. Further, data input between the time of disconnection and the time of detection of the disconnection by the terminal may be lost. Further, there is no consideration for reentering of data by the user due to a fixed screen image.

Accordingly, it is an object of the present invention to provide a data input terminal that can control transmission of input data in a case of poor reception.

According to one aspect of the present invention, provided is a data input terminal for inputting data to be transmitted to a server connected to the data input terminal through a communication network. The data input terminal includes a receiver, an output unit, a status determiner, an input unit, a transmission controller, and a transmitter. The receiver receives communication data transmitted from the server. The output unit generates and outputs display data on the basis of the communication data received by the receiver. The status determiner determines a status of the communication network on the basis of the communication data received by the receiver. The input unit accepts input data from a user. The transmission controller determines an adequacy of transmission of the input data accepted by the input unit to the server on the basis of a determined status determined by the status determiner. The transmitter transmits the input data accepted by the input unit to the server in accordance with a determined adequacy determined by the transmission controller.

The data input terminal may further includes a data storage for storing the input data accepted by the input unit. In such a configuration, the transmitter may transmit the input data stored in the data storage to the server in accordance with the determined adequacy.

The transmission controller of the data input terminal may include at least one of the following three controllers: a first controller for reading, when the determined status indicates a first status, the input data stored in the data storage, transferring the input data read from the data storage to the transmitter, and deleting the input data stored in the data storage, a second controller for deleting, when the determined status indicates a second status, the input data stored in the data storage, and a third controller for keeping, when the determined status indicates a third status, the input data stored in the data storage.

The second controller of the data input terminal may further output, to the output unit, data indicating a discard of the input data, and the third controller may further output, to the output unit, data indicating a suspension of transmission of the input data to the server.

The data input terminal may further include a transmission confirmer for outputting, when the determined status transits from the third status to the first status, to the output unit inquiry data on an adequacy of transmission of the input data stored in the data storage to the server, and accepting response data input via the input unit from the user in response to the inquiry data. In such a configuration, the transmission controller may further include a fourth controller for transferring, when the response data indicating a request for transmission, to the transmitter the input data stored in the data storage and deleting the input data stored in the data storage, and deleting, when the response data indicating a refusal of the transmission, the input data stored in the data storage.

The status determiner of the data input terminal may determine the status of the communication network on the basis of at least one of the following three statuses: a status on delay of data transmitted from the server, a status on loss of data transmitted from the server, and a status on loss of data transmitted from the server due to data compression.

DESCRIPTION OF THE PREFERRED EMBODIMENTS

Embodiments of the present invention will be discussed with reference to attached drawings.

First Embodiment

In a first embodiment of the present invention, input data carelessly input by a user when a communication network is in an abnormal status is not transmitted to a server even when the communication network recovers from the abnormal status to a normal status.

Figure 1:
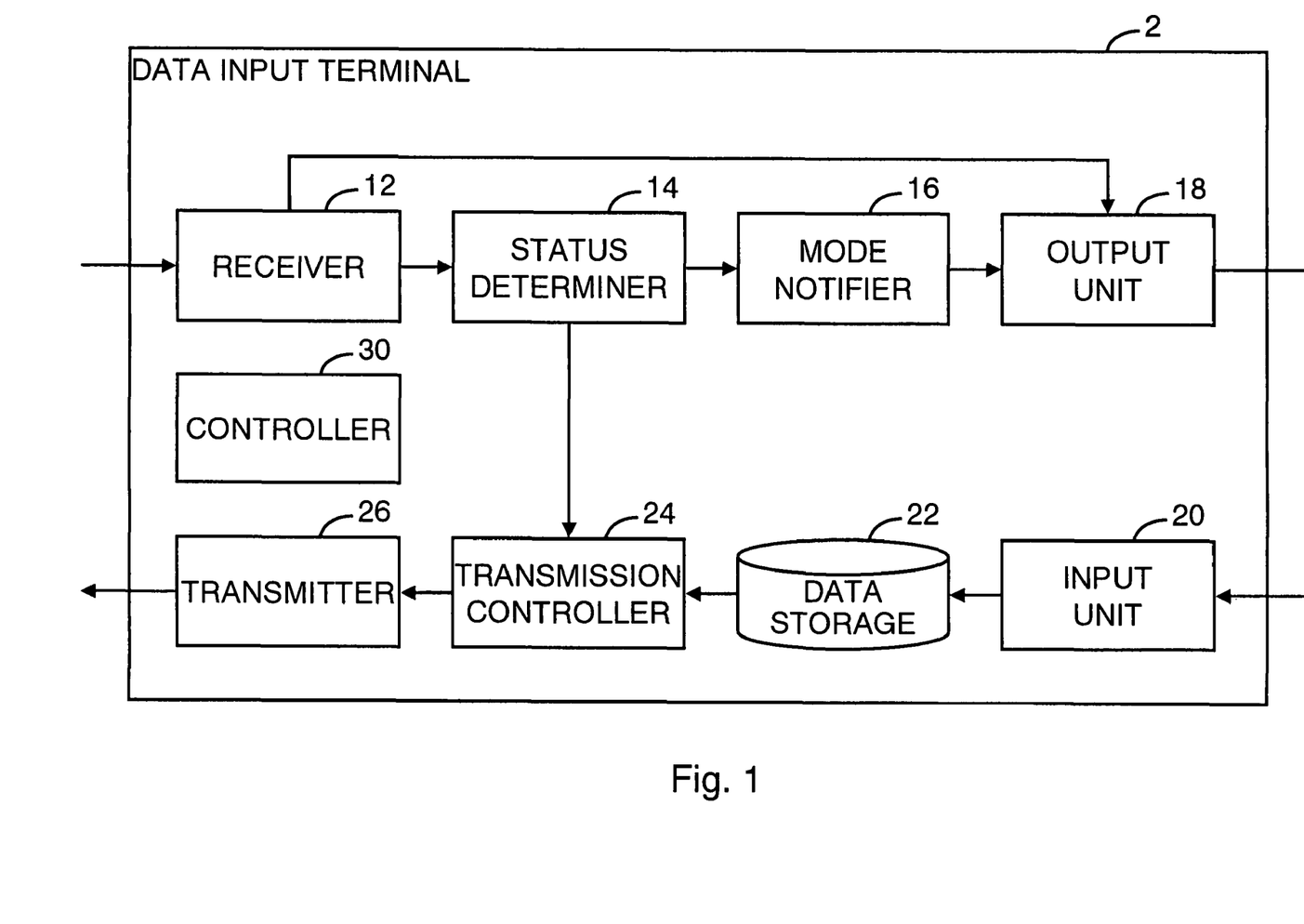
FIG. 1 is a diagram illustrating a system configuration of a data input terminal according to a first embodiment of the present invention.

FIG. 1 is a diagram illustrating a system configuration of a data input terminal according to a first embodiment of the present invention. A data input terminal 2 according to the first embodiment of the present invention includes a receiver 12, a status determiner 14, a mode notifier 16, an output unit 18, an input unit 20, a data storage 22, a transmission controller 24, a transmitter 26, and a controller 30. The receiver 12 receives screen data that is transmitted from a server. The status determiner 14 determines a status of a communication network on the basis of the received screen data. The mode notifier 16 displays a mode for handling input data (input process mode) that is determined on the basis of the status of the communication network. The output unit 18 generates a screen image on the basis of the screen data received by the receiver 12, superimposes a notification image on the basis of data output from the mode notifier 16 on the generated screen image, and displays the superimposed images on a display screen. The input unit 20 accepts an input by a user, and the data storage 22 stores the input data. The transmission controller 24 deals with the input data stored in the data storage 22. The transmitter 26 transmits the input data stored in the data storage 22 to the server. The controller 30 controls the entire data input terminal 2.

The status determiner 14 determines the input process mode in accordance with the status of the communication network, and notifies the determined input process mode to the mode notifier 16 and the transmission controller 24. It is noted that among functions of the data input terminal 2, functions that are not explicitly discussed in the specification are all performed by the controller 30.

Hereinafter, the first embodiment of the present invention will be discussed on the basis of a specific example. In the first embodiment, it is assumed that packets for frame data of a moving image to be displayed on the data input terminal 2 is transmitted from the server to the data input terminal 2. Normally, the frame data of the moving image is divided into a plurality of packets and transmitted. The time the transmitted packets takes to be received by the data input terminal 2 varies depending on statuses of the communication network or transmission paths. Accordingly, the packets may arrive in an order different from the order in the transmission. The data input terminal 2 rearranges the received packets in the order of sequence numbers to form the original frame data. If a certain number of subsequent packets are received before a specific packet is received, it is determined that the specific packet is lost. Then, it is considered that frame data that includes the specific packet is also lost. In the discussion of the first embodiment, for simplicity, it is assumed that screen data is transmitted and received in frames, and a status of the communication network is determined on the basis of a status of a loss of frame data (frame loss). The frame data is received by the receiver 12 and transferred to the output unit 18. The status determiner 14 detects a frame loss and determines an input process mode on the basis of a status of the detected frame loss. In the first embodiment, the input process mode includes two kinds of modes. That is, a normal mode for transmitting input data directly to a server and a discard mode for discarding the input data. In the discard mode, the mode notifier 16 transmits data of a notification image that indicates the discard mode to the output unit 18, and the transmission controller 24 deletes the input data stored in the data storage 22. In the normal mode, the transmission controller 24 reads the input data stored in the data storage 22 to transmit to the transmitter 26 and deletes the input data from the data storage 22.

Figure 2:
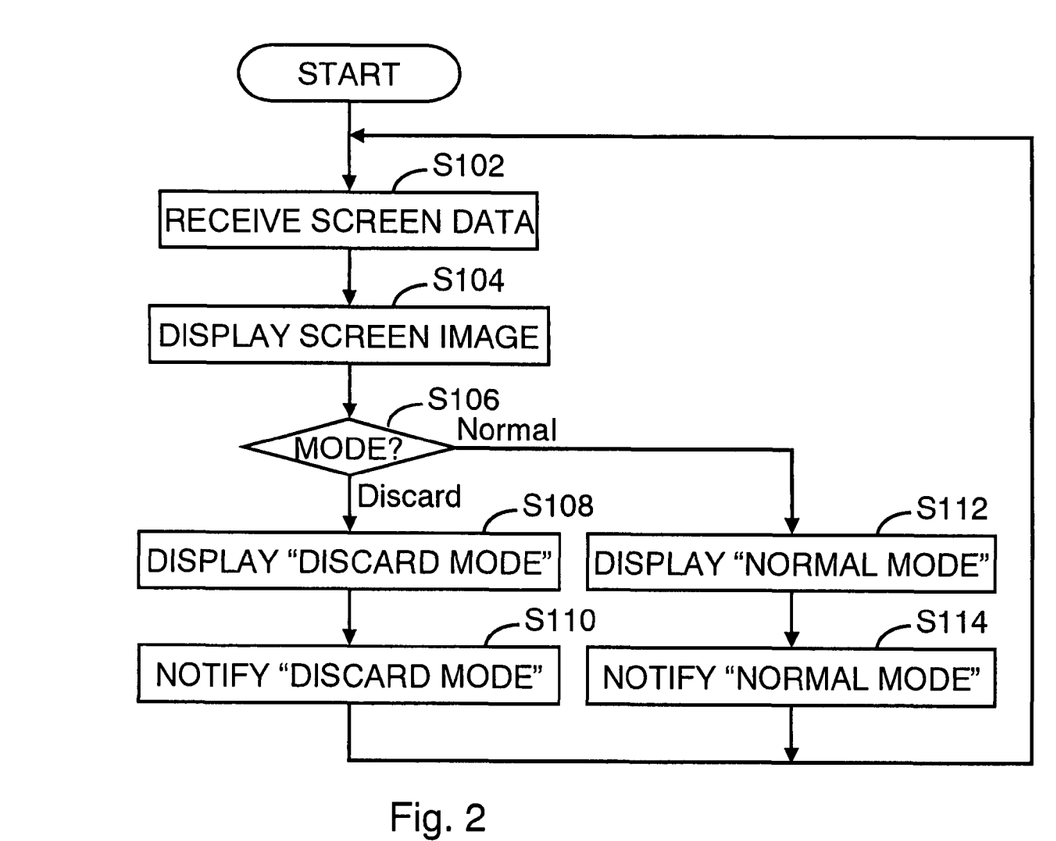
FIG. 2 is a diagram illustrating a flowchart of a screen data reception process performed in a data input terminal according to a first embodiment of the present invention.

FIG. 2 is a diagram illustrating a flowchart of a screen data reception process performed in a data input terminal according to a first embodiment of the present invention. The flow of the screen data reception process according to the first embodiment of the present invention will be discussed with reference to FIG. 2.

In Operation S102, the receiver 12 receives screen data and transfers the screen data to the output unit 18 and the status determiner 14.

In Operation S104, the output unit 18 displays a screen image on the basis of the screen data.

In Operation S106, the status determiner 14 determines whether a reception status of the screen data is normal or not and determines an input process mode. If it is determined that the reception status is normal, the status determiner 14 determines the input process mode to be the normal mode. If it is determined that the reception status is not normal, the status determiner 14 determines the input process mode to be the discard mode.

In Operation S108, when the status determiner 14 determines the input process mode to be the discard mode (Operation S106: Discard), the mode notifier 16 instructs the output unit 18 to output a notification indicating the discard mode. In the first embodiment, as a method for outputting the notification indicating the discard mode, a notification image indicating the discard mode is superimposed on a display screen. However, it is noted that the output method for outputting the notification indicating the discard mode is not limited to the above-discussed method, but any method may be employed if it is possible to notify the user that the input process mode is the discard mode. For example, a text message notifying that the input process mode is the discard mode may be displayed, or an audio message notifying that the input process mode is the discard mode may be output via a loudspeaker. If the output unit 18 is instructed to output the notification indicating the discard mode, the output unit 18 continues to output the notification indicating the discard mode in subsequent steps.

In Operation S110, the status determiner 14 notifies the transmission controller 24 that the input process mode is the discard mode. Then, the screen data reception process returns to Operation S102.

In Operation S112, when the status determiner 14 determines the input process mode to be the normal mode (Operation S106: Normal), the mode notifier 16 instructs the output unit 18 to output a notification indicating the normal mode. The notification indicating the normal mode may be a blank (no data is superimposed). Further, instead of instructing the output unit 18 to output a notification indicating the normal mode, the mode notifier 16 may instruct the output unit 18 to stop outputting the notification indicating the discard mode.

In Operation S114, the status determiner 14 notifies the transmission controller 24 that the input process mode is the normal mode. Then, the screen data reception process returns to Operation S102.

Figure 3:
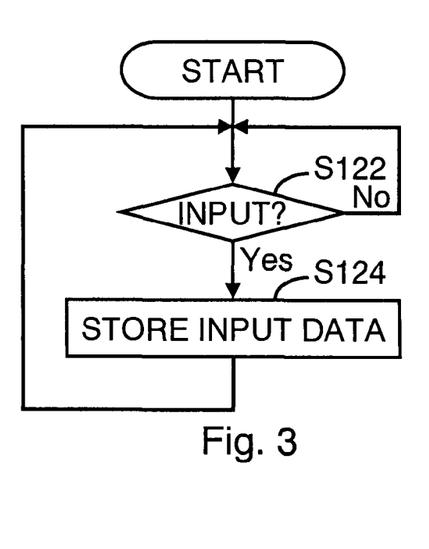
FIG. 3 is a diagram illustrating a flowchart of a data input process performed in a data input terminal according to a first embodiment of the present invention.

FIG. 3 is a diagram illustrating a flowchart of a data input process performed in a data input terminal according to a first embodiment of the present invention. A flow of the data input process according to the first embodiment will be discussed with reference to FIG. 3.

In Operation S122, the input unit 20 waits for a data input by a user.

In Operation S124, in response to an input by the user (Operation S122: Yes), the input unit 20 stores the input data in the data storage 22.

Figure 4:
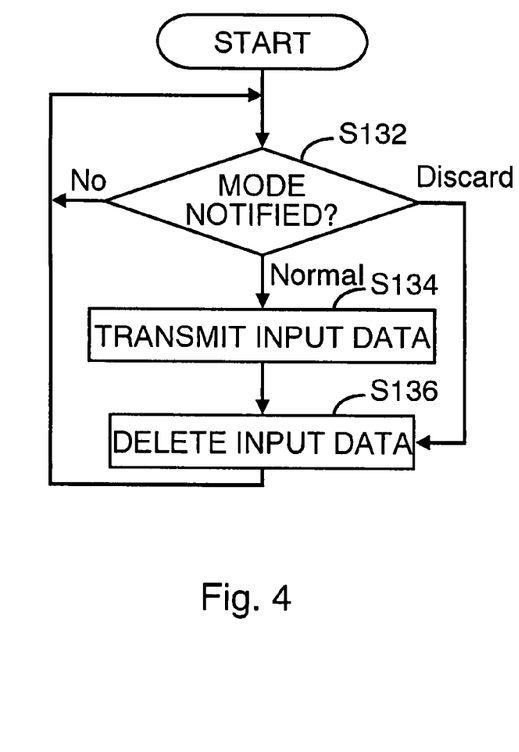
FIG. 4 is a diagram illustrating a flowchart of a transmission control process performed in a data input terminal according to a first embodiment of the present invention.

FIG. 4 is a diagram illustrating a flowchart of a transmission control process performed in a data input terminal according to a first embodiment of the present invention. A flow of the transmission control process according to the first embodiment will be discussed with reference to FIG. 4.

In Operation S132, the transmission controller 24 waits for a mode notification from the status determiner 14. In response to a notification indicating the discard mode from the status determiner 14 (Operation S132: Discard), the transmission control process proceeds to Operation S136.

In Operation S134, in response to a notification indicating the normal mode from the status determiner 14 (Operation S132: Normal), the transmission controller 24 reads the input data from the data storage 22, and instructs the transmitter 26 to transmit the input data.

In Operation S136, the transmission controller 24 deletes the input data from the data storage 22. Then, the transmission control process returns to Operation S132.

As discussed above, the input unit 20 does not transmit the data input by the user to the transmitter 26, but stores the input data in the data storage 22. The transmission controller 24 deletes the input data stored in the data storage 22 each time the status determiner 14 determines a reception status of screen data. If the determination result is "normal", before deleting the input data stored in the data storage 22, the transmission controller 24 reads the input data stored in the data storage 22 and instructs the transmitter 26 to transmit the input data. On the basis of the screen data received by the receiver 12, the output unit 18 displays a screen image. If the determination result of the status determiner 14 is not "normal", the output unit 18 outputs a notification indicating the discard mode. That is, the user is notified that subsequent input data is to be discarded.

Figure 5:
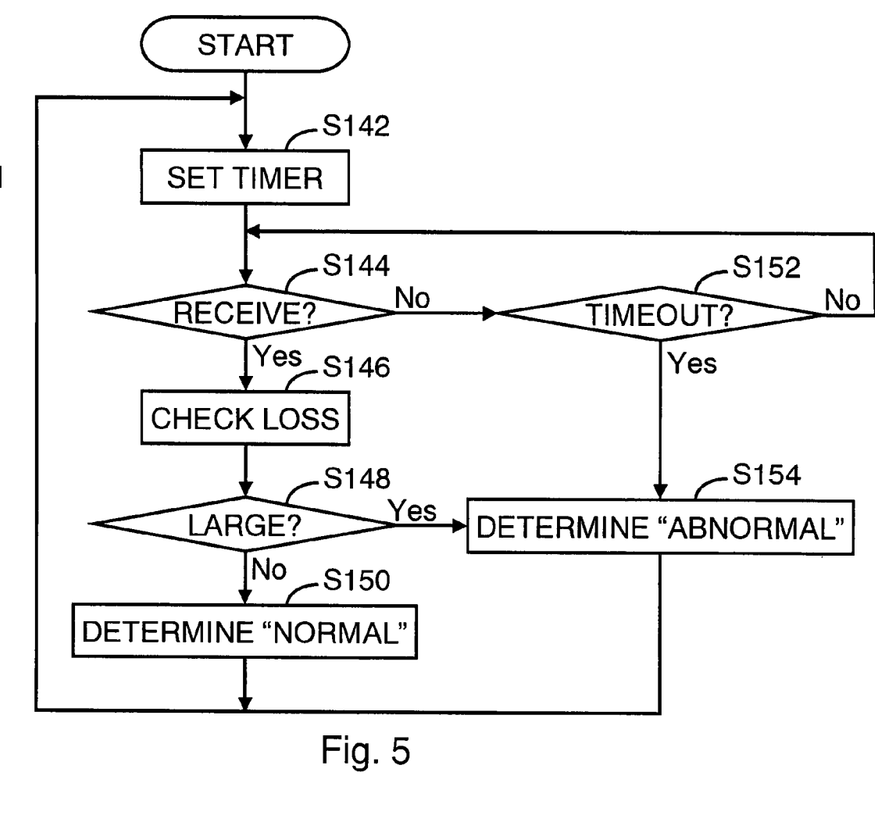
FIG. 5 is a diagram illustrating a flowchart of a reception status determination process performed in a data input terminal according to a first embodiment of the present invention.

FIG. 5 is a diagram illustrating a flowchart of a reception status determination process performed in a data input terminal according to a first embodiment of the present invention. A flow of the reception status determination process according to the first embodiment of the present invention will be discussed with reference to FIG. 5.

In Operation S142, the status determiner 14 set a timer for a predetermined period of time to measure a delay of frame data.

In Operation S144, the receiver 12 waits for frame data.

In Operation S146, when the receiver 12 receives frame data (Operation S144: Yes), the status determiner 14 checks whether a frame loss exists or not. To check the frame loss, any method may be employed. For example, a sequence number of previously received frame data is stored, and a difference between the sequence number of the previously received frame data and a sequence number of frame data received this time is calculated. In a case where the difference is 1, it is determined that the frame loss does not exist. In a case where the difference is 2 or more, it is determined that the frame loss exists. After the calculation, the stored sequence number is replaced with the sequence number of the frame data received this time.

In Operation S148, the status determiner 14 checks whether the number of frame loss is large or not (that is, the difference of the sequence numbers is larger than a predetermined number or not).

In Operation S150, if it is determined that the number of frame loss is not large (Operation S148: No), the status determiner 14 determines that the reception status is "normal". Then, the reception status determination process returns to Operation S142.

In Operation S152, while the receiver 12 does not receive frame data (Operation S144: No), the timer continues to count the time.

In Operation S154, when the time set to the timer has elapsed (Operation S152: Yes), or in a case where the number of frame loss is large (Operation S148: Yes), the status determiner 14 determines that the reception status is "abnormal". Then, the reception status determination process returns to Operation S142.

The time period of one frame is short. Accordingly, even if a small quantity of frame data is lost, the input operations of the user in response to the screen image are not affected. In the first embodiment, if frame data of a predetermined quantity or more is lost, it is determined that the reception status is "abnormal".

In the above-discussed reception status determination process, instead of the frames, packets may be used. That is, the status determiner 14 may detect a loss of a packet (packet loss), and determine an input process mode on the basis of a status of the detected packet loss. In such a case, the sequence number to be stored may be a sequence number that has a maximum value in sequence numbers of the packets that have been received so far.

Figure 6:
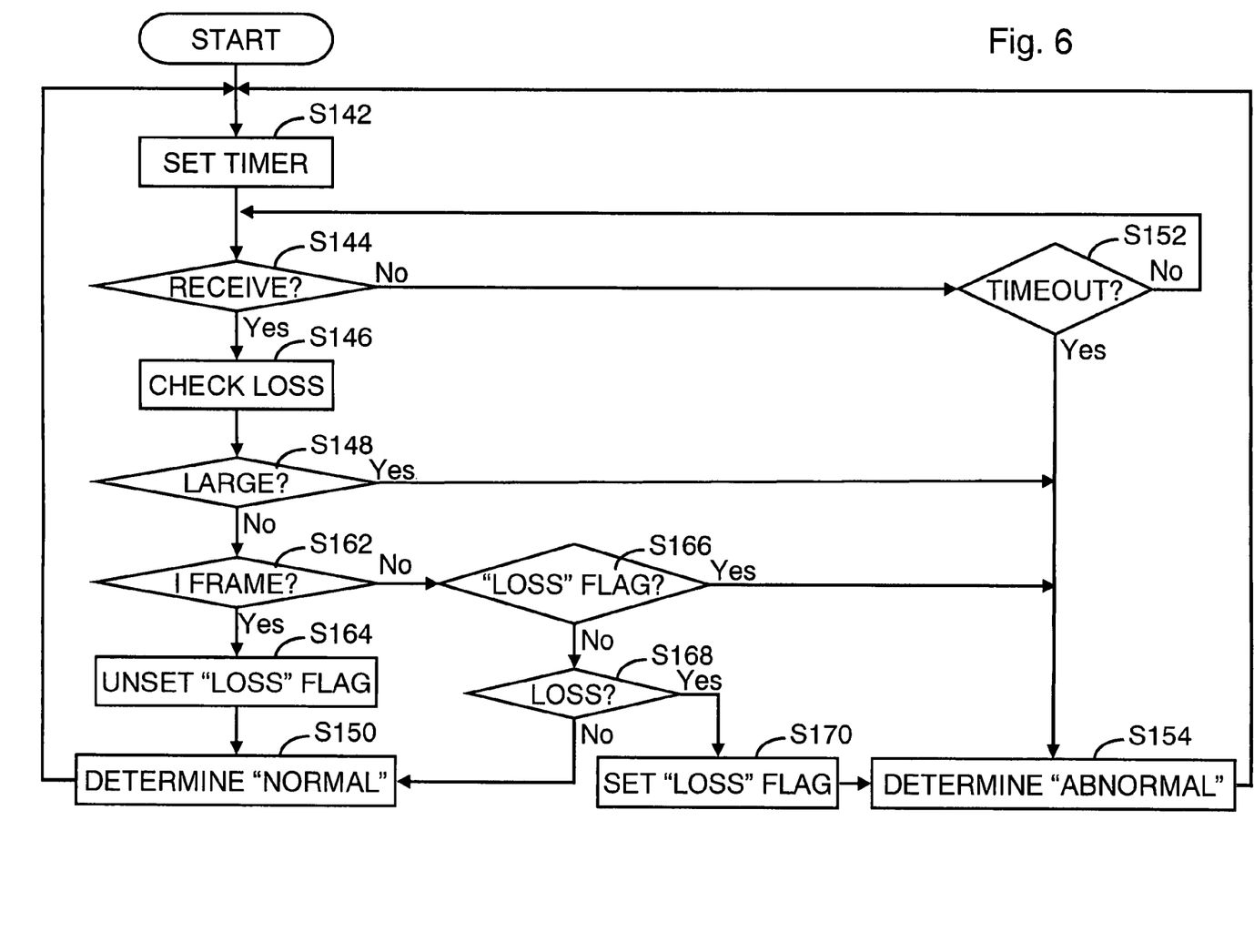
FIG. 6 is a diagram illustrating a flowchart of a modified reception status determination process performed in a data input terminal according to a first embodiment of the present invention.

Depending on standards for moving image compression, even a small number of frame losses may largely affect a screen image. For example, a typical method employing inter-frame prediction combines an I-frame, P-frame and B-frame. The I-frame has self-contained data of one frame without depending on other frames. The P-frame or B-frame has data of a difference from another frame and refers to the other frame to reproduce a frame image. In such a case, even one frame loss of the P-frame or B-frame may affects reproduction of subsequent frame images. Even in that case, reception of frame data of the I-frame returns the screen image to a normal status. To cope with such a case, it is preferable to modify the reception status determination process shown in FIG. 5. FIG. 6 is a diagram illustrating a flowchart of a modified reception status determination process performed in a data input terminal according to a first embodiment of the present invention. The flowchart shown in FIG. 6 differs from the flowchart shown in FIG. 5 in that Operations S162 to S170 are added. Upon receiving frame data of an I-frame, the reception status is determined to be "normal" until a frame loss occurs. Upon detecting a frame loss, the reception status is determined to be "abnormal" until frame data of a next I-frame is received. To perform this, a "loss" flag for indicating the occurrence of the frame loss is provided. If a frame loss is detected, the "loss" flag is set. When frame data of an I-frame is received, the "loss" flag is unset. Hereinafter, a flow of the added operations will be discussed.

In Operation S162, if the number of frame loss is not large (Operation S148: No), the status determiner 14 checks whether the received frame is an I-frame or not.

In Operation S164, if the received frame is an I-frame (Operation S162: Yes), the status determiner 14 unsets the "loss" flag.

In Operation S166, if the received frame is not an I-frame (Operation S162: No), the status determiner 14 checks whether the "loss" flag is set or not. If the "loss" flag is set (Operation S166: Yes), the reception status determination process proceeds to Operation S154.

In Operation S168, if the "loss" flag is not set (Operation S166: No), the status determiner 14 checks whether a frame loss exits or not on the basis of the check result in Operation S146. If the frame loss does not exist (Operation S168: No), the reception status determination process proceeds to Operation S150.

In Operation S170, if the frame loss exists (Operation S168: Yes), the status determiner 14 sets the "loss" flag. Then, the reception status determination process proceeds to Operation S154.

As discussed above, according to the first embodiment of the present invention, when it is determined that the reception status is normal, the stored input data is transmitted to the server. If it is determined that the reception status is not normal, the stored input data is discarded. Accordingly, it is possible to control not to transmit to the server, when the communication network recovers from the abnormal status, data that is carelessly input by the user when the communication network is abnormal.

Second Embodiment

In the first embodiment of the present invention, if it is determined that a reception status is not normal, stored input data is discarded. However, there is a possibility that a user intentionally input the data in advance. In such a case, it is preferable to transmit the stored input data to a server. In a second embodiment of the present invention, the data input terminal shows the stored input data to the user and asks the user whether to transmit the stored input data to the server.

Figure 7:
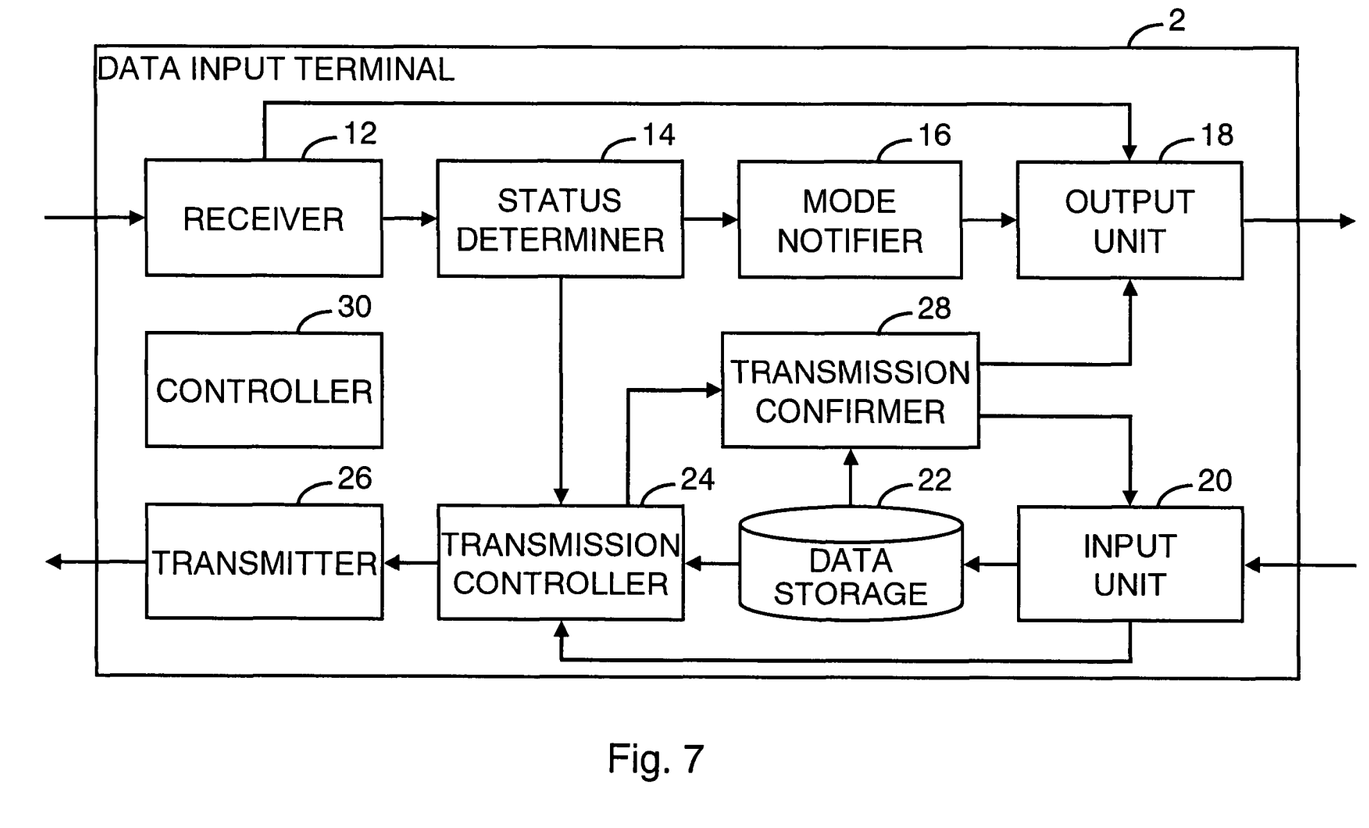
FIG. 7 is a diagram illustrating a system configuration of a data input terminal according to a second embodiment of the present invention.

FIG. 7 is a diagram illustrating a system configuration of a data input terminal according to a second embodiment of the present invention. The data input terminal 2 according to the second embodiment includes a transmission confirmer 28 in addition to the configuration shown in FIG. 1. The transmission confirmer 28 instructs, when a reception status returns to a normal status, the output unit 18 to display input data stored in the data storage 22 to make a user input a confirmation input indicating whether to transmit to the server the input data stored in the data storage 22.

Figure 8:
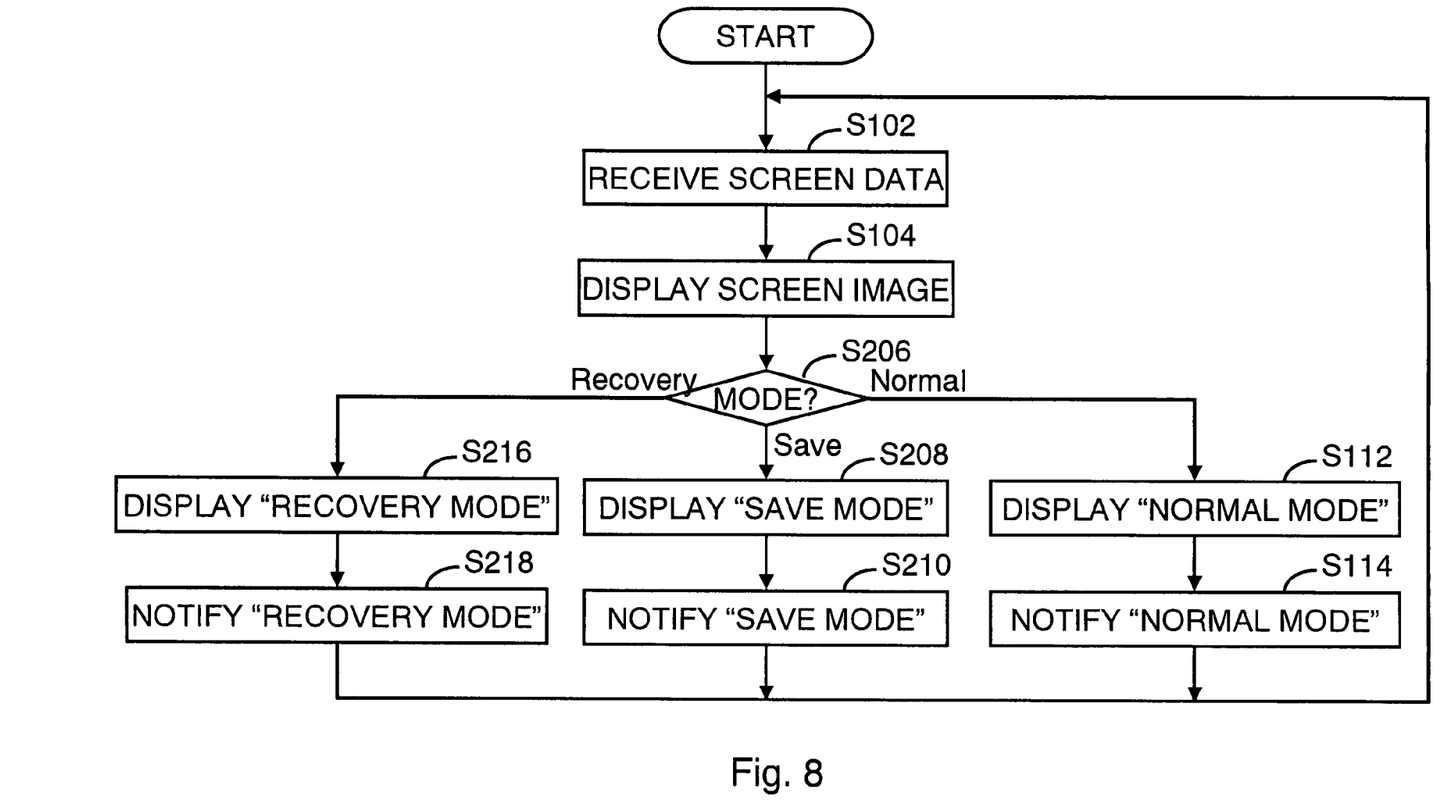
FIG. 8 is a diagram illustrating a flowchart of a screen data reception process performed in a data input terminal according to a second embodiment of the present invention.

FIG. 8 is a diagram illustrating a flowchart of a screen data reception process performed in a data input terminal according to a second embodiment of the present invention. The flowchart shown in FIG. 8 differs from the flowchart shown in FIG. 2 in that Operations S106 to S110 are changed to Operations S206 to S210, and Operations S216 and S218 are added. In the flow of the screen data reception process according to the second embodiment of the present invention, the parts different from the flowchart shown in FIG. 2 will be discussed with reference to FIG. 8.

In Operation S206, the status determiner 14 determines whether a reception status of screen data is normal or not to determine an input process mode. If it is determined that the normal reception status has been continuing, the status determiner 14 determines the input process mode to be the normal mode. If it is determined that the reception status is not normal, the status determiner 14 determines the input process mode to be a save mode. If it is determined that the reception status has changed from an abnormal status to a normal status, the status determiner 14 determines the input process mode to be a recovery mode.

In Operation S208, if the status determiner 14 determines the input process mode to be the save mode (Operation S206: Save), the mode notifier 16 instructs the output unit 18 to output a notification indicating the save mode.

In Operation S210, the status determiner 14 notifies the transmission controller 24 that the input process mode is the save mode. Then, the screen data reception process returns to Operation S102.

In Operation S216, if the status determiner 14 determines the input process mode to be the recovery mode (Operation S206: Recovery), the mode notifier 16 instructs the output unit 18 to output a notification indicating the recovery mode.

In Operation S218, the status determiner 14 notifies the transmission controller 24 that the input process mode is the recovery mode. Then, the screen data reception process returns to Operation S102.

Figure 9:
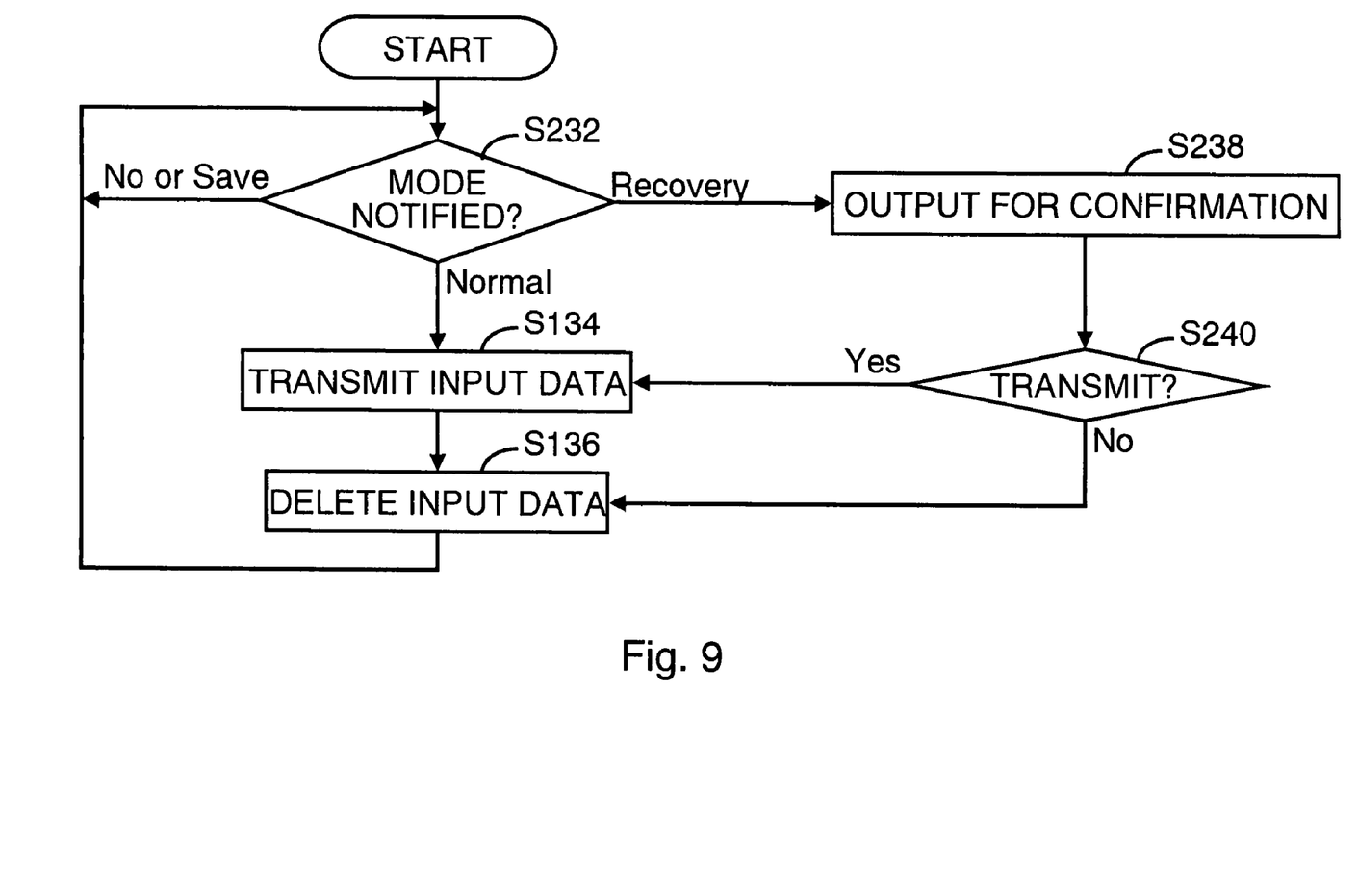
FIG. 9 is a diagram illustrating a flowchart of a transmission control process performed in a data input terminal according to a second embodiment of the present invention.

FIG. 9 is a diagram illustrating a flowchart of a transmission control process performed in a data input terminal according to a second embodiment of the present invention. The flowchart shown in FIG. 9 differs from the flowchart shown in FIG. 4 in that Operation S132 is changed to Operation S232, and Operations S238 and S240 are added. In the flow of the transmission control process according to the second embodiment of the present invention, the parts different from the flowchart shown in FIG. 4 will be discussed with reference to FIG. 9.

In Operation S232, the transmission controller 24 waits for a mode notification from the status determiner 14. In response to a notification of the save mode from the status determiner 14 (Operation S232: Save), the transmission control process returns to Operation S232.

In Operation S238, in response to a notification of the recovery mode from the status determiner 14 (Operation S232: Recovery), the transmission confirmer 28 temporarily stops input from the input unit 20, reads the input data from the data storage 22, and instructs the output unit 18 to output the input data.

In Operation S240, after a predetermined period of time has elapsed, the temporary stop of input from the input unit 20 is released. The transmission control process proceeds to Operation S134 upon a user input via the input unit 20 of an instruction for transmission. The transmission control process proceeds to Operation S136 upon a user input via the input unit 20 of an instruction for discard.

The above-discussed temporary stop of input from the input unit 20 is performed to distinguish between the user's instruction and the input data to the server.

Figure 10:
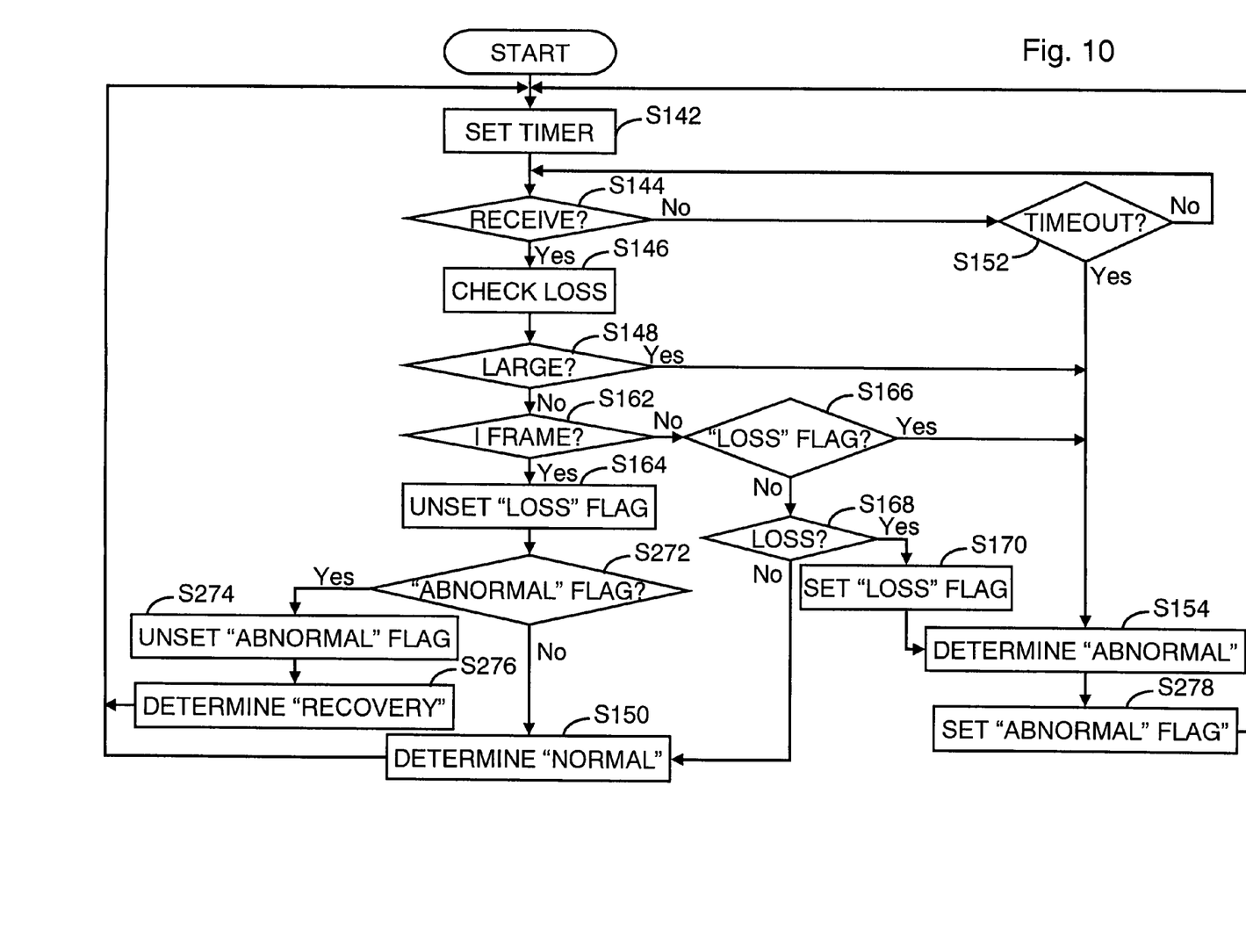
FIG. 10 is a diagram illustrating a flowchart of a reception status determination process performed in a data input terminal according to a second embodiment of the present invention.

FIG. 10 is a diagram illustrating a flowchart of a reception status determination process performed in a data input terminal according to a second embodiment of the present invention. The flowchart shown in FIG. 10 differs from the flowchart shown in FIG. 6 in that Operations S272 to S278 are added. In the second embodiment of the present invention, an "abnormal" flag for indicating that the previous determination result in the reception status determination process was "abnormal" is provided in order to distinguish the recovery mode from the normal mode. If it is determined that a reception status is "abnormal", the "abnormal" flag is set. If it is determined that the reception status is not "abnormal", the "abnormal" flag is unset.

In the flow of the reception status determination process according to the second embodiment of the present invention, the parts different from the flowchart shown in FIG. 6 will be discussed with reference to FIG. 10.

In Operation S272, the status determiner 14 checks whether the "abnormal" flag is set or not. If the "abnormal" flag is not set (Operation S272: No), the reception status determination process proceeds to Operation S150.

In Operation S274, if the "abnormal" flag is set (Operation S272: Yes), the status determiner 14 unsets the "abnormal" flag.

In Operation S276, the status determiner 14 determines that the reception status is "recovery". Then, the reception status determination process returns to Operation S142.

In Operation S278, the status determiner 14 sets the "abnormal" flag.

As discussed above, according to the second embodiment of the present invention, the input data stored in the data storage may be transmitted to the server in accordance with the user's instruction.

It is noted that among the input data stored in the data storage, only a part of the input data may be transmitted to the server in accordance with the user's instruction.

According to embodiments of the present invention, data input by the user is always temporarily stored. The stored input data is transferred to the server when it is confirmed that the status of the communication network is normal. Accordingly, it is possible to provide a data input terminal that may control the transmission of the input data when a poor reception occurs.

In the above discussion, it is assumed that screen data of moving image is transmitted from the server. However, it is not limited to the above. The technology discussed above may be applied to audio data or any data transmitted regularly to change the contents of output for the user. Further, the technology may be applied to some sort of data transmitted from the server to change the contents of output for the user in response to the input data transmitted from the data input terminal. In such a case, setting of the timer for determining a time-out is performed after the transmission of the input data from the data input terminal.

The data input terminal according to the above-discussed embodiments of the present invention may be realized as hardware, and also as software for a computer. For example, a program that instructs the computer to execute the functions of the receiver 12, the status determiner 14, the mode notifier 16, the output unit 18, the input unit 20, the transmission controller 24, the transmitter 26, and the controller 30 shown in FIG. 1 may be configured. The program may be read on a memory of the computer, and implemented. Thus, the data input terminal may be realized.

Figure 11:
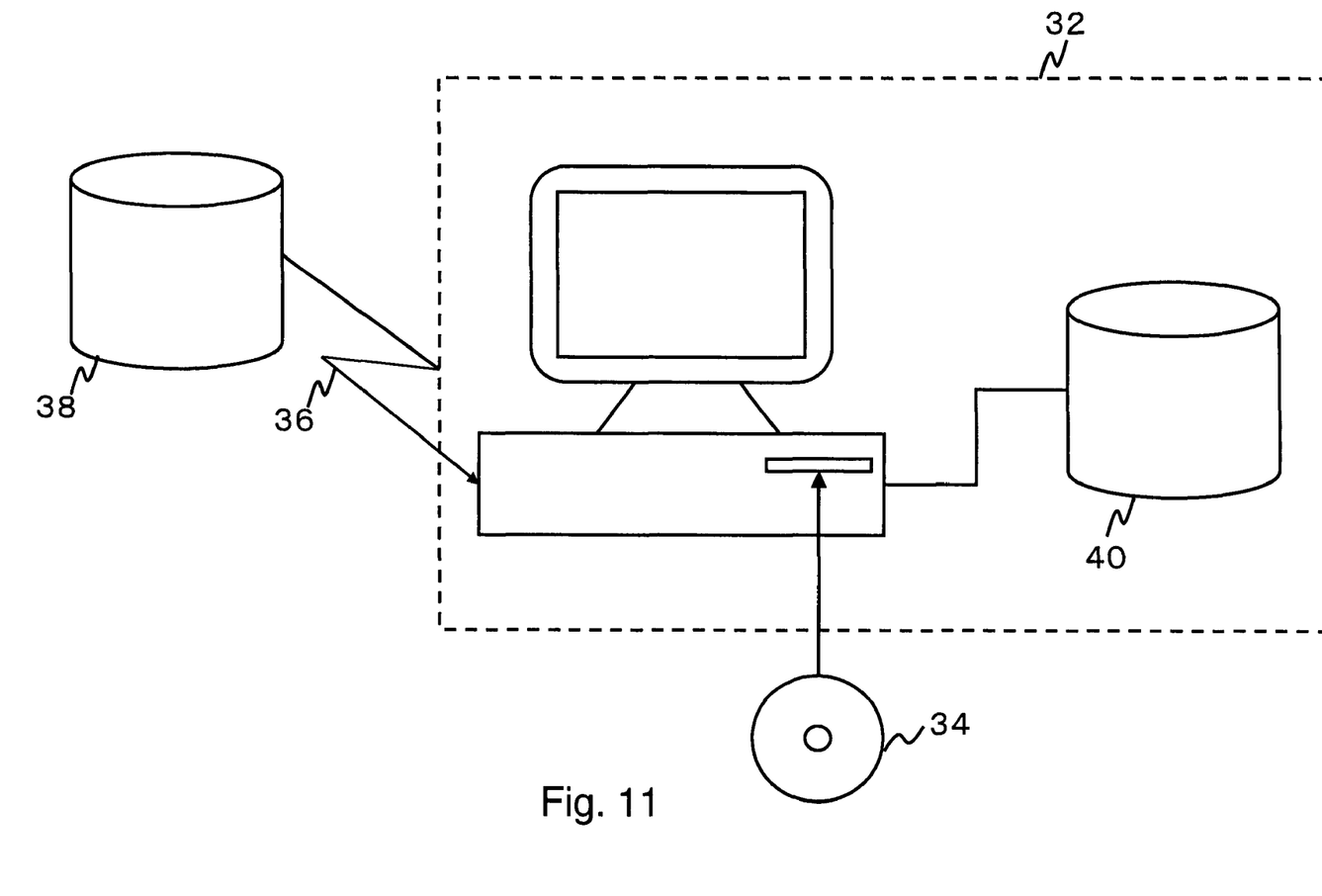
FIG. 11 is a diagram illustrating an example of a computer environment.

As shown in FIG. 11, the program that realizes the data input terminal according to the above-discussed embodiments of the present invention may be stored not only in a portable recording medium 34 such as a CD-ROM, a CD-RW, a DVD-R, a DVD-RAM, a DVD-RW, and a flexible disk but also may be stored in a storage device 38 that is provided over a communication line 36 and a storage device or recording medium 40 in a computer system 32 such as a hard disk or a RAM. When the program is implemented, the program is loaded and implemented on a main memory.

The structural elements of the data input terminal according to the above-discussed embodiments of the present invention may be realized in arbitrary combination. For example, a plurality of the structural elements may be implemented as a member. Further, a structural element may be formed by a plurality of members.

What is claimed is:

1. A data input terminal for inputting data to be transmitted to a server connected to said data input terminal through a communication network, comprising:
    a receiver for receiving communication data transmitted from the server;
    an output unit for generating and outputting display data on the basis of the communication data received by the receiver;
    a status determiner for determining a status of the communication network on the basis of the communication data received by the receiver;
    an input unit for accepting input data from a user;
    a transmission controller for determining an adequacy of transmission of the input data accepted by the input unit to the server on the basis of a determined status determined by the status determiner; and
    a transmitter for transmitting the input data accepted by the input unit to the server in accordance with a determined adequacy determined by the transmission controller.

2. The data input terminal of claim 1, further comprising:
    a data storage for storing the input data accepted by the input unit, wherein
    said transmitter transmits the input data stored in the data storage to the server in accordance with the determined adequacy.

3. The data input terminal of claim 2, wherein
said transmission controller includes at least one of
    a first controller for
        reading, when the determined status indicates a first status, the input data stored in the data storage,
        transferring the input data read from the data storage to the transmitter, and
        deleting the input data stored in the data storage,
    a second controller for deleting, when the determined status indicates a second status, the input data stored in the data storage, and
    a third controller for keeping, when the determined status indicates a third status, the input data stored in the data storage.

4. The data input terminal of claim 3, wherein
said second controller further outputs, to the output unit, data indicating a discard of the input data, and
said third controller further outputs, to the output unit, data indicating a suspension of transmission of the input data to the server.

5. The data input terminal of claim 3, further comprising:
    a transmission confirmer for
        outputting, when the determined status transits from the third status to the first status, to the output unit inquiry data on an adequacy of transmission of the input data stored in the data storage to the server, and
        accepting response data input via the input unit from the user in response to the inquiry data,
wherein
    said transmission controller further includes
        a fourth controller for transferring, when the response data indicating a request for transmission, to the transmitter the input data stored in the data storage and deleting the input data stored in the data storage, and deleting, when the response data indicating a refusal of the transmission, the input data stored in the data storage.

6. The data input terminal of claim 1, wherein
said status determiner determines the status of the communication network on the basis of at least one of
a status on delay of data transmitted from the server,
a status on loss of data transmitted from the server, and
a status on loss of data transmitted from the server due to data compression.

7. A data transmission method executed by a data input terminal for inputting data to be transmitted to a server connected to said data input terminal through a communication network, said method comprising:
receiving communication data transmitted from the server;
generating display data on the basis of the communication data received;
outputting the display data;
determining a status of the communication network on the basis of the communication data received;
accepting input data from a user;
determining an adequacy of transmission of the input data to the server on the basis of a determined status determined in said operation of determining a status of the communication network; and
transmitting the input data to the server in accordance with a determined adequacy determined in said operation of determining an adequacy of transmission of the input data.

8. The data transmission method of claim 7, said data input terminal having a data storage for storing the input data, said method further comprising:
storing the input data in the data storage,
wherein
in said operation of transmitting the input data, the input data stored in the data storage is transmitted to the server in accordance with the determined adequacy.

9. The data transmission method of claim 8, wherein
said operation of determining an adequacy of transmission of the input data includes at least one of
a first operation of transmitting, when the determined status indicates a first status, the input data stored in the data storage to the server and deleting the input data stored in the data storage,
a second operation of deleting, when the determined status indicates a second status, the input data stored in the data storage, and
a third operation of keeping, when the determined status indicates a third status, the input data stored in the data storage.

10. The data transmission method of claim 9, wherein
said second operation further includes outputting data indicating a discard of the input data, and
said third operation further includes outputting data indicating a suspension of transmission of the input data to the server.

11. The data transmission method of claim 9, further comprising:
outputting, when the determined status transits from the third status to the first status, inquiry data on an adequacy of transmission of the input data stored in the data storage to the server, and
accepting response data from the user in response to the inquiry data,
wherein
said operation of determining an adequacy of transmission of the input data further includes
transmitting, when the response data indicating a request for transmission, the input data stored in the data storage to the server and deleting the input data stored in the data storage, and
deleting, when the response data indicating a refusal of the transmission, the input data stored in the data storage.

12. The data transmission method of claim 7, wherein
in said operation of determining a status of the communication network, the status of the communication network is determined on the basis of at least one of
a status on delay of data transmitted from the server,
a status on loss of data transmitted from the server, and
a status on loss of data transmitted from the server due to data compression.

13. A computer readable storage medium storing a program of instructions to a computer connected to a server through a communication network, said instructions being for executing a method for inputting data to be transmitted to said server, said method comprising:
receiving communication data transmitted from the server;
generating display data on the basis of the communication data received;
outputting the display data;
determining a status of the communication network on the basis of the communication data received;
accepting input data from a user;
determining an adequacy of transmission of the input data to the server on the basis of a determined status determined in said operation of determining a status of the communication network; and
transmitting the input data to the server in accordance with a determined adequacy determined in said operation of determining an adequacy of transmission of the input data.

\* \* \* \* \*